(12) United States Patent
Gramlich et al.

(10) Patent No.: US 12,529,429 B2
(45) Date of Patent: Jan. 20, 2026

(54) DYNAMIC SLAB GATE VALVES

(71) Applicant: Bestway Oilfield, Inc., Channelview, TX (US)

(72) Inventors: Don Channing Gramlich, Richmond, TX (US); Mehul Jain, Houston, TX (US)

(73) Assignee: Bestway Oilfield, Inc., Channelview, TX (US)

( * ) Notice: Subject to any disclaimer, the term of this patent is extended or adjusted under 35 U.S.C. 154(b) by 0 days.

(21) Appl. No.: 18/416,795

(22) Filed: Jan. 18, 2024

(65) Prior Publication Data

US 2025/0075803 A1  Mar. 6, 2025

Related U.S. Application Data

(60) Provisional application No. 63/544,777, filed on Oct. 18, 2023, provisional application No. 63/535,053, filed on Aug. 28, 2023.

(51) Int. Cl.
*F16K 3/20* (2006.01)
*F16K 3/02* (2006.01)
*F16K 3/36* (2006.01)

(52) U.S. Cl.
CPC ............. *F16K 3/20* (2013.01); *F16K 3/0227* (2013.01); *F16K 3/36* (2013.01)

(58) Field of Classification Search
CPC ............. F16K 3/20; F16K 3/0227; F16K 3/36
USPC .................................. 251/355, 193, 195–202
See application file for complete search history.

(56) References Cited

U.S. PATENT DOCUMENTS

| | | | |
|---|---|---|---|
| 1,708,851 A | 4/1929 | Sparks | |
| 1,752,657 A | 4/1930 | Sparks | |
| 2,030,458 A | 2/1936 | McKellar et al. | |
| 2,063,655 A * | 12/1936 | Barner | F16K 3/36 251/266 |
| 2,150,887 A | 3/1939 | Mueller et al. | |
| 2,356,630 A | 8/1944 | Strecker | |
| 2,359,741 A | 10/1944 | Venton et al. | |
| 2,520,364 A | 8/1950 | Hobbs | |
| 2,766,829 A | 10/1956 | Watts et al. | |
| 2,815,187 A | 12/1957 | Hamer | |

(Continued)

FOREIGN PATENT DOCUMENTS

| | | |
|---|---|---|
| CA | 2638434 A1 | 1/2010 |
| CN | 201902656 U | 7/2011 |

(Continued)

OTHER PUBLICATIONS

International Search Report and Written Opinion received in Patent Cooperation Treaty Application No. PCT/US2025/024618, dated Jun. 5, 2025.

(Continued)

*Primary Examiner* — John Bastianelli
(74) *Attorney, Agent, or Firm* — Johnston IP Law, PLLC

(57) ABSTRACT

A dynamic slab gate valve for use in controlling fluid flow through pipelines and other tubulars has a dynamic seat assembly and a dynamic skirt assembly. The dynamic seat assembly is urged toward a gate of the dynamic slab gate valve by an energizer to maintain a seal between a seat and the gate. The dynamic skirt assembly is urged toward the gate of the dynamic slab gate valve by an energizer to maintain a seal with the gate.

12 Claims, 12 Drawing Sheets

(56) References Cited

U.S. PATENT DOCUMENTS

| | | | |
|---|---|---|---|
| 2,977,975 A * | 4/1961 | Allen | F16K 29/02 |
| | | | 251/312 |
| 3,001,183 A | 9/1961 | McKenney et al. | |
| 3,083,945 A | 4/1963 | Shafer et al. | |
| 3,095,004 A * | 6/1963 | Jackson, Jr. | F16K 3/36 |
| | | | 137/246.11 |
| 3,347,261 A * | 10/1967 | Yancey | F16K 3/207 |
| | | | 137/246.22 |
| 3,412,748 A * | 11/1968 | Volpin | F16K 3/36 |
| | | | 137/239 |
| 3,541,430 A | 11/1970 | Luger | |
| 3,556,472 A | 1/1971 | Grove et al. | |
| 3,696,831 A * | 10/1972 | Fowler | F16K 3/36 |
| | | | 251/327 |
| 3,768,774 A | 10/1973 | Baugh | |
| 3,827,673 A | 8/1974 | Houlgrave et al. | |
| 3,965,987 A | 6/1976 | Biffle | |
| 4,208,035 A | 6/1980 | Alvarez et al. | |
| 4,245,661 A * | 1/1981 | McGee | F16K 3/36 |
| | | | 137/72 |
| 4,281,819 A * | 8/1981 | Linder | F16K 39/04 |
| | | | 251/282 |
| 4,390,186 A | 6/1983 | McGee et al. | |
| 4,440,404 A | 4/1984 | Roach et al. | |
| 4,471,943 A | 9/1984 | Nelson | |
| 4,572,298 A | 2/1986 | Weston | |
| 4,652,022 A | 3/1987 | Nichols | |
| 4,823,882 A | 4/1989 | Stokley et al. | |
| 4,867,254 A | 9/1989 | Gavignet | |
| 4,925,154 A | 5/1990 | Baker | |
| 4,926,903 A | 5/1990 | Kawai | |
| 5,180,173 A | 1/1993 | Kimura et al. | |
| 5,205,356 A | 4/1993 | Bridges et al. | |
| 5,341,835 A | 8/1994 | Lanning, II | |
| D352,094 S | 11/1994 | Baker | |
| 5,377,955 A | 1/1995 | Baker | |
| 5,394,943 A | 3/1995 | Harrington | |
| 5,540,282 A | 7/1996 | Dallas | |
| 5,743,335 A | 4/1998 | Bussear | |
| 5,785,075 A | 7/1998 | Uchida et al. | |
| 6,176,466 B1 | 1/2001 | Lam et al. | |
| D440,283 S | 4/2001 | Cain et al. | |
| 6,257,276 B1 | 7/2001 | Muller et al. | |
| 6,360,822 B1 | 3/2002 | Robertson | |
| 6,364,024 B1 | 4/2002 | Dallas | |
| 6,425,413 B2 | 7/2002 | Davis et al. | |
| 6,454,015 B1 | 9/2002 | Armstrong et al. | |
| 6,659,419 B2 | 12/2003 | Chatufale | |
| 6,975,103 B1 | 12/2005 | Blom | |
| 7,069,987 B2 | 7/2006 | Kwasniewski et al. | |
| D527,077 S | 8/2006 | Chen | |
| D529,587 S | 10/2006 | Chen | |
| 7,140,445 B2 | 11/2006 | Shahin et al. | |
| 7,150,326 B2 | 12/2006 | Bishop et al. | |
| 7,299,880 B2 | 11/2007 | Logiudice et al. | |
| 7,306,201 B2 | 12/2007 | Lam | |
| 7,308,934 B2 | 12/2007 | Swagerty et al. | |
| 7,311,148 B2 | 12/2007 | Giroux et al. | |
| 7,614,448 B2 | 11/2009 | Swagerty et al. | |
| 7,644,772 B2 | 1/2010 | Avant et al. | |
| 8,327,943 B2 | 12/2012 | Borak et al. | |
| 8,360,095 B2 | 1/2013 | Morgan et al. | |
| D690,395 S | 9/2013 | Altmannsberger | |
| 8,950,485 B2 | 2/2015 | Wilkins et al. | |
| 9,004,091 B2 | 4/2015 | Joseph et al. | |
| 9,181,778 B2 | 11/2015 | Hurtado et al. | |
| 9,347,289 B2 | 5/2016 | Judge et al. | |
| 9,453,578 B2 | 9/2016 | Sundararajan et al. | |
| 9,624,754 B2 | 4/2017 | Merron et al. | |
| 9,759,334 B2 | 9/2017 | Hunter et al. | |
| 9,759,347 B2 | 9/2017 | Elliott | |
| 9,850,740 B2 | 12/2017 | Atencio | |
| 9,879,507 B2 | 1/2018 | Gilstad et al. | |
| 9,885,420 B2 | 2/2018 | Sundararajan | |
| 10,060,548 B1 * | 8/2018 | Oak | F16K 31/508 |
| 10,094,366 B2 | 10/2018 | Marica | |
| 10,174,848 B2 | 1/2019 | Sundararajan et al. | |
| 10,233,721 B2 * | 3/2019 | Hoang | F16K 25/04 |
| 10,451,187 B2 | 10/2019 | Roberts | |
| 10,494,898 B2 | 12/2019 | Kajaria et al. | |
| 10,508,744 B2 | 12/2019 | Roberts | |
| 10,662,749 B1 | 5/2020 | Hill et al. | |
| 10,663,068 B2 | 5/2020 | Puranik et al. | |
| 10,677,360 B2 | 6/2020 | Sundararajan | |
| 10,895,139 B2 | 1/2021 | Sizemore et al. | |
| 11,009,419 B2 | 5/2021 | Kalimuthu et al. | |
| 11,105,426 B2 | 8/2021 | Roberts | |
| 11,125,341 B2 | 9/2021 | Sundararajan | |
| 11,131,393 B2 | 9/2021 | Sundararajan | |
| 11,149,513 B2 | 10/2021 | Scott | |
| 11,435,001 B2 | 9/2022 | Kalimuthu | |
| 11,549,594 B2 | 1/2023 | Sundararajan | |
| 11,624,444 B2 | 4/2023 | Kalimuthu | |
| 11,644,105 B2 | 5/2023 | Sundararajan | |
| 11,746,632 B2 | 9/2023 | Scott | |
| 12,013,046 B2 | 6/2024 | Sundararajan | |
| 12,110,979 B1 | 10/2024 | Horvath et al. | |
| 12,110,980 B2 | 10/2024 | Roberts | |
| 12,287,041 B1 | 4/2025 | Gramlich et al. | |
| 2003/0015681 A1 | 1/2003 | Chatufale | |
| 2004/0040746 A1 | 3/2004 | Niedermayr et al. | |
| 2004/0238177 A1 | 12/2004 | Fossli | |
| 2010/0012328 A1 | 1/2010 | Nikirofuk | |
| 2011/0083852 A1 | 4/2011 | Bertrand | |
| 2011/0108275 A1 | 5/2011 | Borak et al. | |
| 2012/0012341 A1 | 1/2012 | White et al. | |
| 2012/0223267 A1 | 9/2012 | Marica | |
| 2013/0277589 A1 | 10/2013 | Vaughan | |
| 2014/0326038 A1 | 11/2014 | Fauveau | |
| 2015/0090342 A1 | 4/2015 | Cartwright et al. | |
| 2015/0315869 A1 | 11/2015 | Landry | |
| 2016/0040802 A1 | 2/2016 | Clark et al. | |
| 2016/0123099 A1 | 5/2016 | Kapavarapu et al. | |
| 2016/0232997 A1 | 8/2016 | Kim et al. | |
| 2016/0291609 A1 | 10/2016 | Lucas et al. | |
| 2017/0191350 A1 | 7/2017 | Johns et al. | |
| 2017/0191570 A1 | 7/2017 | Roberts | |
| 2018/0283138 A1 | 10/2018 | Peyregne et al. | |
| 2019/0010781 A1 | 1/2019 | Tran | |
| 2019/0277409 A1 | 9/2019 | Puranik et al. | |
| 2019/0346048 A1 | 11/2019 | Harrel et al. | |
| 2019/0391028 A1 | 12/2019 | Kalimuthu et al. | |
| 2020/0240537 A1 * | 7/2020 | Moseley | F16K 3/30 |
| 2020/0355321 A1 | 11/2020 | Zerkus et al. | |
| 2021/0025505 A1 | 1/2021 | Vijay | |
| 2021/0215255 A1 * | 7/2021 | Kalimuthu | F16K 27/044 |
| 2022/0074502 A1 | 3/2022 | Roberts | |
| 2022/0397201 A1 | 12/2022 | Kalimuthu | |
| 2023/0003305 A1 | 1/2023 | Gavela et al. | |
| 2023/0031393 A1 | 2/2023 | Kalimuthu | |
| 2023/0228332 A1 | 7/2023 | Sundararajan | |
| 2023/0272860 A1 | 8/2023 | Sundararajan | |
| 2024/0077147 A1 | 3/2024 | Duncan et al. | |
| 2024/0200667 A1 | 6/2024 | Kalimuthu | |
| 2025/0075803 A1 | 3/2025 | Gramlich et al. | |
| 2025/0129854 A1 | 4/2025 | Gramlich et al. | |
| 2025/0224036 A1 | 7/2025 | Gramlich et al. | |

FOREIGN PATENT DOCUMENTS

| | | |
|---|---|---|
| CN | 201963923 U | 9/2011 |
| CN | 202252053 U | 5/2012 |
| CN | 202927097 U | 5/2013 |
| CN | 203051805 U | 7/2013 |
| CN | 203670846 U | 6/2014 |
| CN | 204164393 U | 2/2015 |
| CN | 108138735 A | 6/2018 |
| EP | 0567913 A1 | 11/1993 |
| EP | 0597177 A1 | 5/1994 |
| EP | 2976559 B1 | 1/2020 |
| EP | 3292329 B1 | 2/2021 |
| EP | 3889477 A1 | 10/2021 |
| EP | 3670977 B1 | 12/2021 |

(56) References Cited

FOREIGN PATENT DOCUMENTS

| | | |
|---|---|---|
| EP | 3982018 A1 | 4/2022 |
| GB | 2272271 B | 5/1994 |
| WO | 2004008009 A1 | 1/2004 |
| WO | 2015163246 A1 | 10/2015 |
| WO | 2016073666 A1 | 5/2016 |

OTHER PUBLICATIONS

International Search Report and Written Opinion received in Patent Cooperation Treaty Application No. PCT/U82025/024979, dated Aug. 6, 2025, 12 pages.
International Search Report and Written Opinion received in Patent Cooperation Treaty Application No. PCT/US2025/035004, dated Sep. 9, 2025, 13 pages.
International Search Report and Written Opinion received in Patent Cooperation Treaty Application No. PCT/US2025/035023, dated Aug. 28, 2025, 15 pages.

* cited by examiner

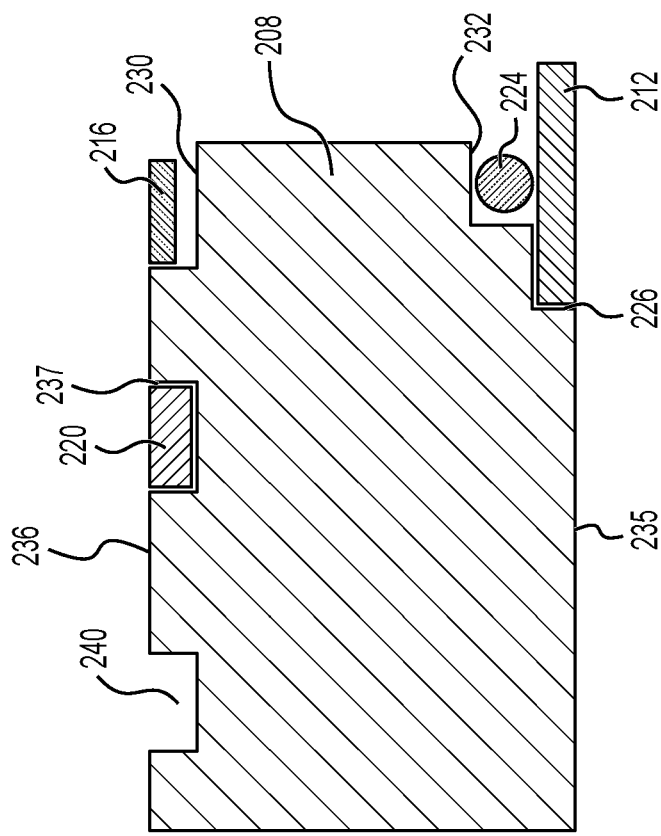
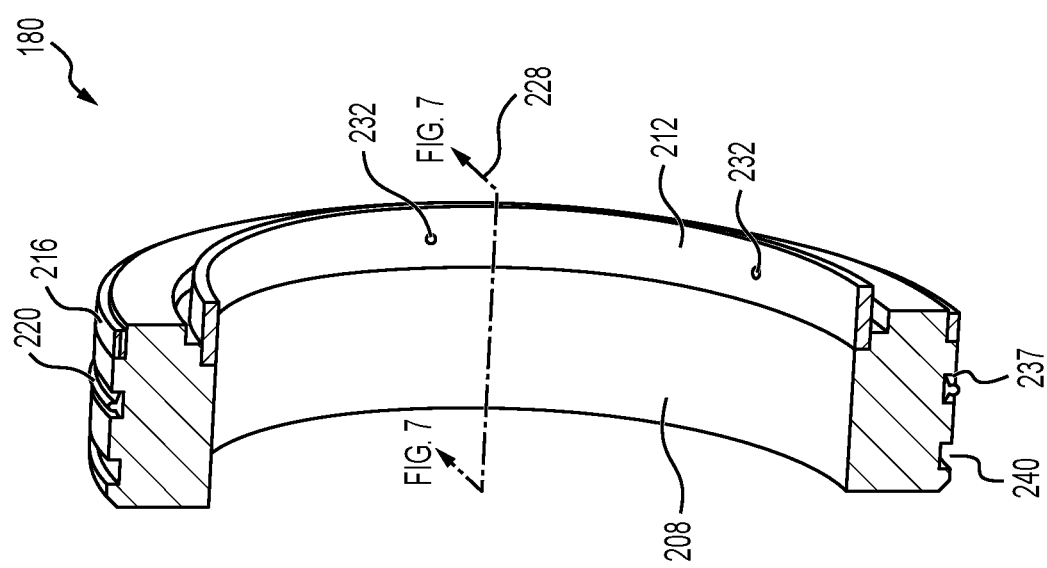

DYNAMIC SLAB GATE VALVES

RELATED APPLICATION

This application claims the benefit of U.S. Provisional Patent Application 63/535,053 filed on Aug. 28, 2023, and U.S. Provisional Patent Application 63/544,777 filed on Oct. 18, 2023, both of which are incorporated herein by reference for all purposes.

TECHNICAL FIELD

This application is directed, in general, to valves for use in fluid transfer applications, and more specifically to dynamic slab gates valves, which may be used in oil and gas applications.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Gate valves are used to control the transfer of fluids in tubing and pipelines. Specifically, gate valves are used to stop and start the flow of fluids in a downstream direction. Gate valves are commonly used in the oil and gas industry to control the flow of various fluids such as production fluids, water, fracking fluids, and other fluids used in drilling, operating, and maintaining oil and gas wells.

Gate valves generally operate by actuation of an internal gate, which in one position has an opening to allow upstream fluids to flow through the valve and in a downstream direction and a second position which blocks flow through the valve thereby preventing transfer of fluid in a downstream direction. While gate valves have been in existence for a long time, improvements are still desired.

SUMMARY

According to an illustrative embodiment, a slab gate valve includes a valve body formed with a through-bore in a first direction and formed with a gate cavity in a second direction, which is orthogonal to the first direction. The slab gate valve further includes a slab gate having a first portion and a second portion, wherein the slab gate has a first side and a second side. The gate cavity is sized and configured to receive the slab gate. The first portion of the slab gate is sized and configured to occlude the through-bore when the slab gate is in a closed position. The second portion of the slab gate valve is formed with a flow aperture for allowing flow therethrough when the slab gate is in an open position. At least one stem is coupled to the slab gate for selectively moving the slab gate between the open position and the closed position.

The slab gate valve further includes a downstroke lubricant cavity formed in a portion of the valve body; a first seat cavity formed in the valve body proximate a first intersection of the through-bore and the gate cavity on a first side of the first intersection; and a second seat cavity formed in the valve body proximate a second intersection of the through-bore and the gate cavity on a second side of the second intersection. The slab gate valve also includes a first dynamic seat assembly disposed in the first seat cavity, a second dynamic seat assembly disposed in the second seat cavity, a first dynamic skirt disposed adjacent to the first side of the slab gate and disposed between the first seat cavity and the downstroke lubricant cavity, and a second dynamic skirt disposed adjacent to the second side of the slab gate and disposed between the second seat cavity and the downstroke lubricant cavity.

In one illustrative embodiment, the first dynamic seat assembly in the slab gate valve of the previous two paragraphs may include a first cylindrical seat having a first side and a second side, wherein the second side is adjacent to the first side of the slab gate. A first debris ring slot is formed on an inner portion of the first cylindrical seat. The first dynamic seat assembly may also include a debris ring proximate the first side of the first cylindrical seat and disposed at least partially within the first debris ring slot. The first cylindrical seat may be formed with a seat energizer cavity proximate the first side of the first cylindrical seat. The first dynamic seat assembly may also include a seat energizer disposed at least partially in the energizer cavity and operable to urge the first dynamic seat toward the slab gate.

According to another illustrative embodiment, a slab gate valve includes a valve body formed with a through-bore in a first direction and formed with a gate cavity in a second direction orthogonal to the first direction and a slab gate having a first portion and a second portion, wherein the slab gate has a first side and a second side. The gate cavity is sized and configured to receive the slab gate. The first portion of the slab gate is sized and configured to occlude the through-bore when the slab gate is in a closed position. The second portion of the slab gate valve is formed with a flow aperture for allowing flow therethrough when the slab gate is in an open position. The slab gate valve also includes at least one stem coupled to the slab gate for selectively moving the slab gate between the open position and the closed position; a downstroke lubricant cavity formed in a portion of the valve body; at least one seat cavity formed in the valve body proximate an intersection of the through-bore and the gate cavity; and at least one dynamic seat assembly disposed in the at least one seat cavity.

According to still another illustrative embodiment, a slab gate valve includes a valve body formed with a through-bore in a first direction and formed with a gate cavity in a second direction orthogonal to the first direction and a slab gate having a first portion and a second portion, wherein the slab gate has a first side and a second side. The gate cavity is sized and configured to receive the slab gate. The first portion of the slab gate is sized and configured to occlude the through-bore when the slab gate is in a closed position. The second portion of the slab gate is formed with a flow aperture for allowing flow therethrough when the slab gate is in an open position. The slab gate valve further includes at least one stem coupled to the slab gate for selectively moving the slab gate between the open position and the closed position; a downstroke lubricant cavity formed in a portion of the valve body; and at least one dynamic skirt disposed adjacent to the slab gate and between the slab gate and the downstroke lubricant cavity. Other valves and embodiments are presented further below.

DESCRIPTION OF THE DRAWINGS

Illustrative embodiments of the present invention are described in detail below with reference to the attached drawing figures, which are incorporated by reference herein and wherein:

FIG. 6 is a schematic perspective view with a portion shown in cross section of a dynamic seat assembly of an illustrative embodiment of a dynamic slab gate valve;

FIG. 7 is a schematic cross-sectional view of a dynamic seat assembly of an illustrative embodiment of a dynamic slab gate valve;

DETAILED DESCRIPTION

Figure 1:
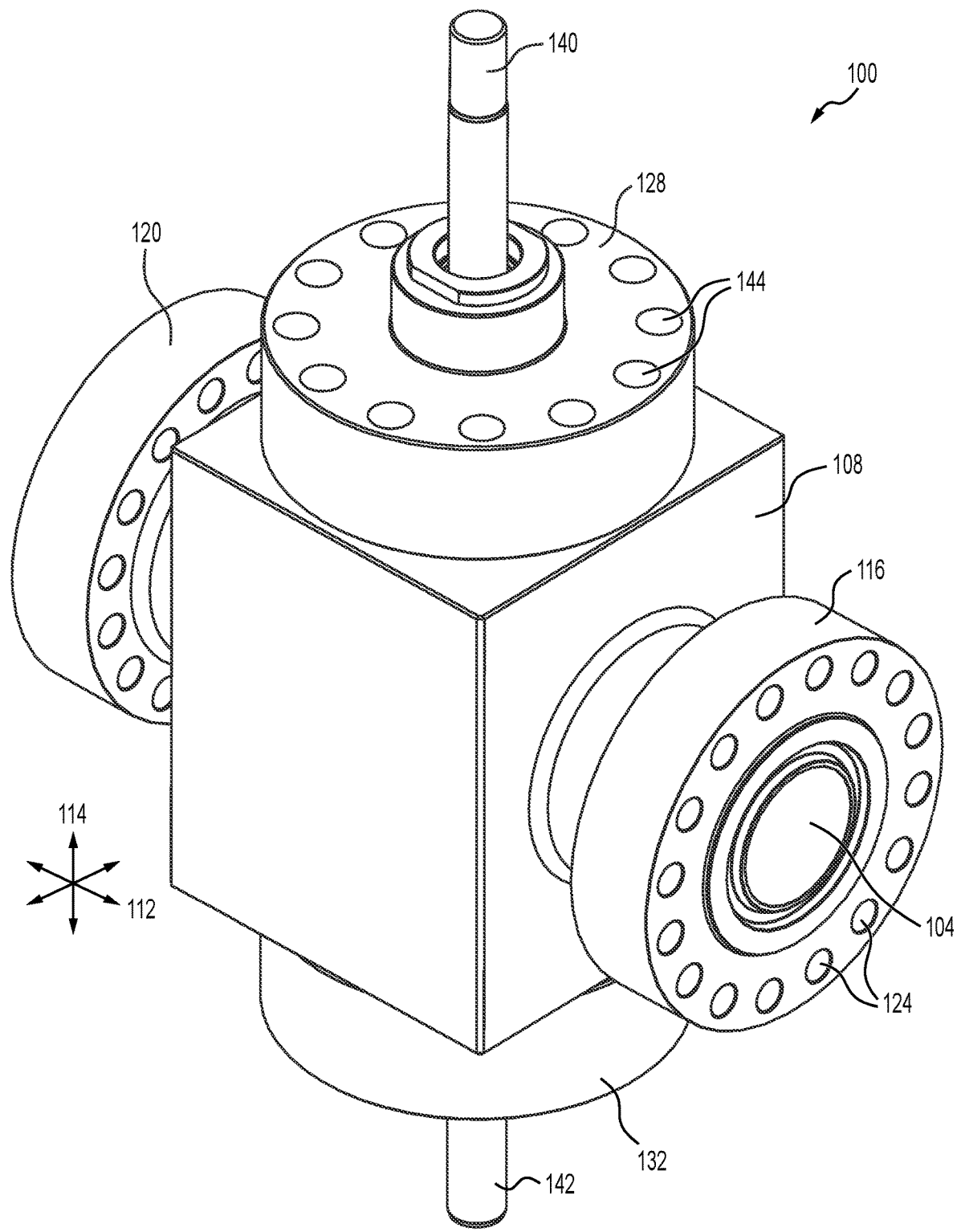
FIG. 1 is a schematic perspective view of an illustrative embodiment of a dynamic slab gate valve.
Figure 2:
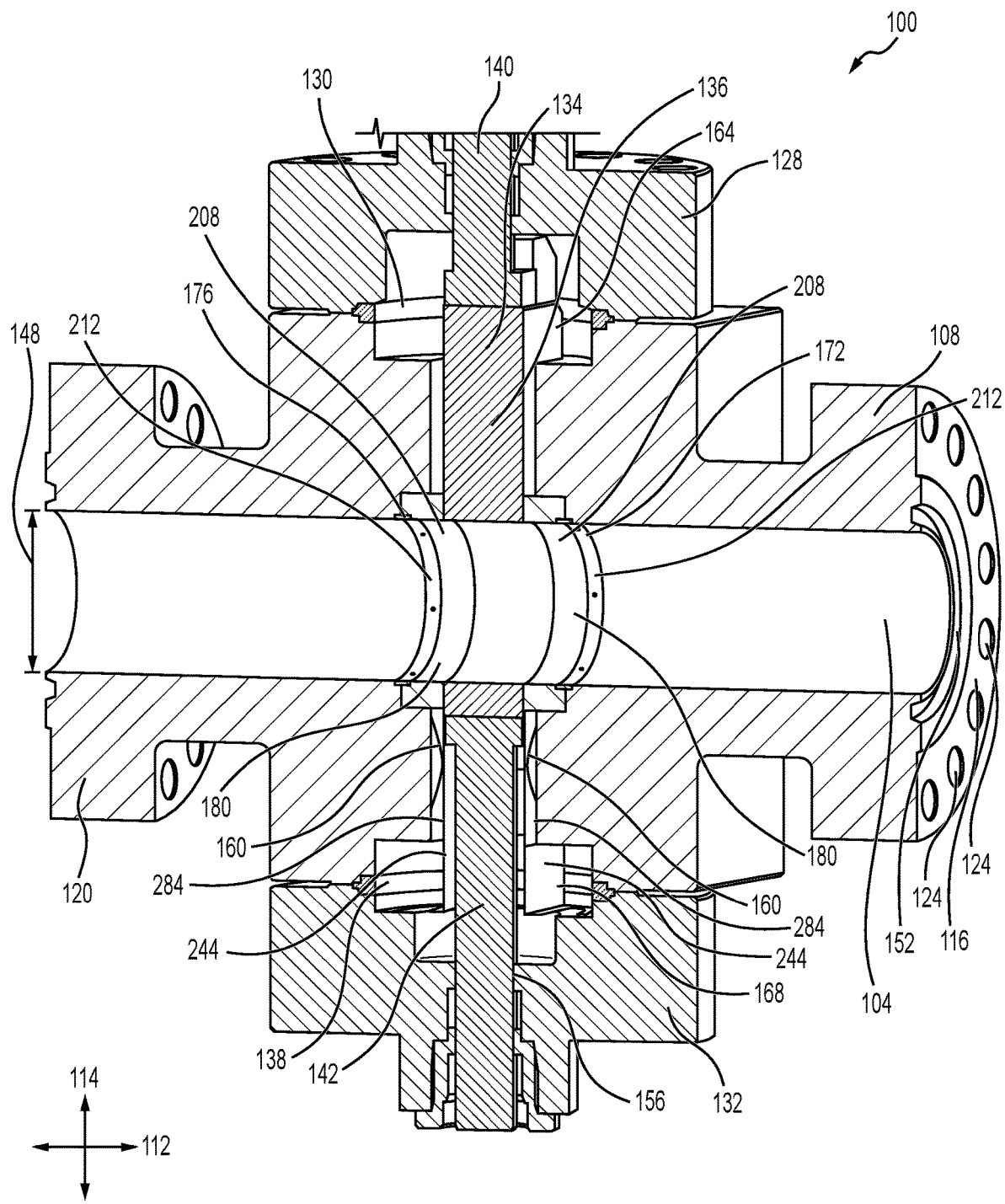
FIG. 2 is a schematic, perspective view with a portion shown in cross section of an illustrative embodiment of a dynamic slab gate valve.
Figure 3:
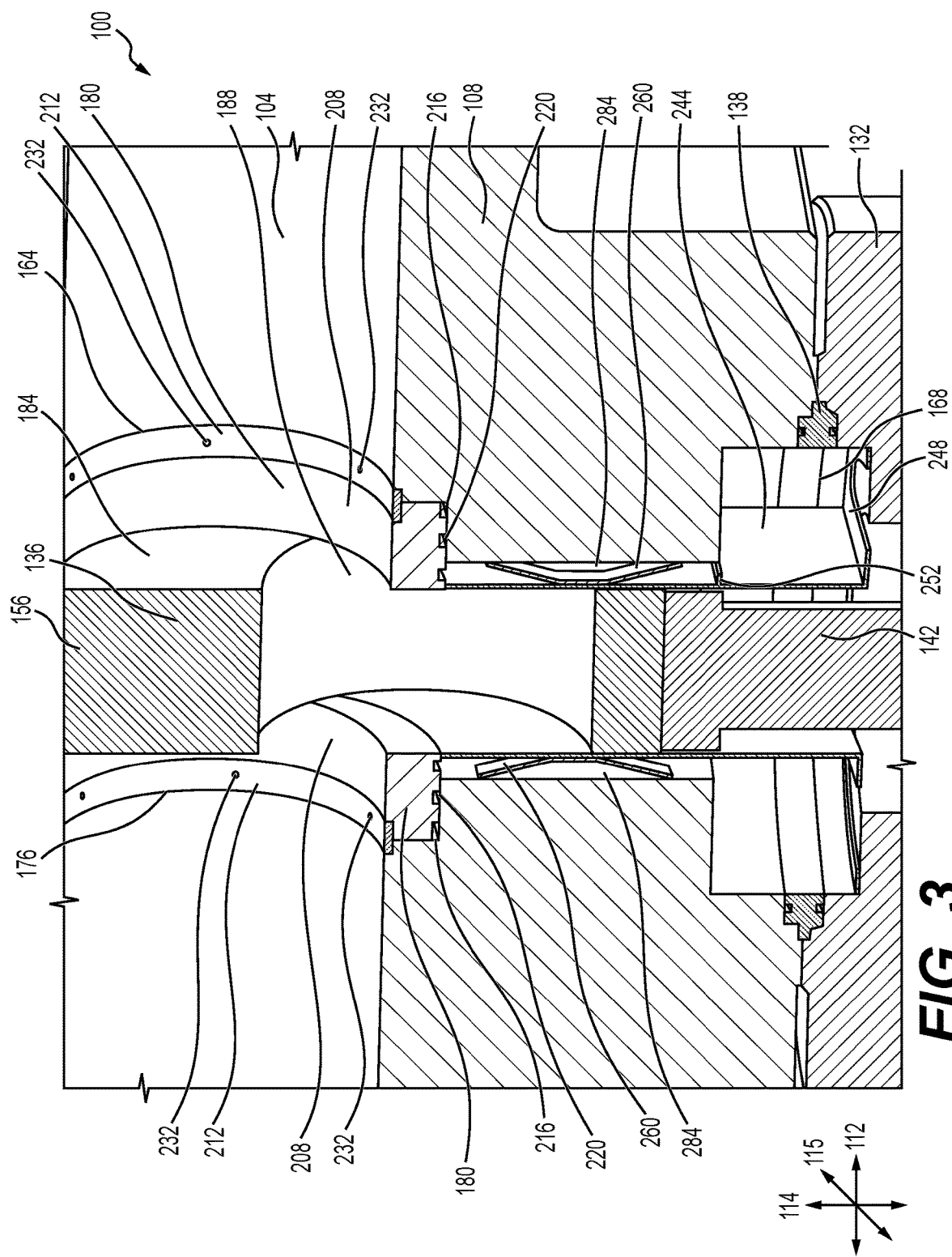
FIG. 3 is a schematic, perspective view with a portion shown in cross section of an illustrative embodiment of a dynamic slab gate valve.
Figure 4:
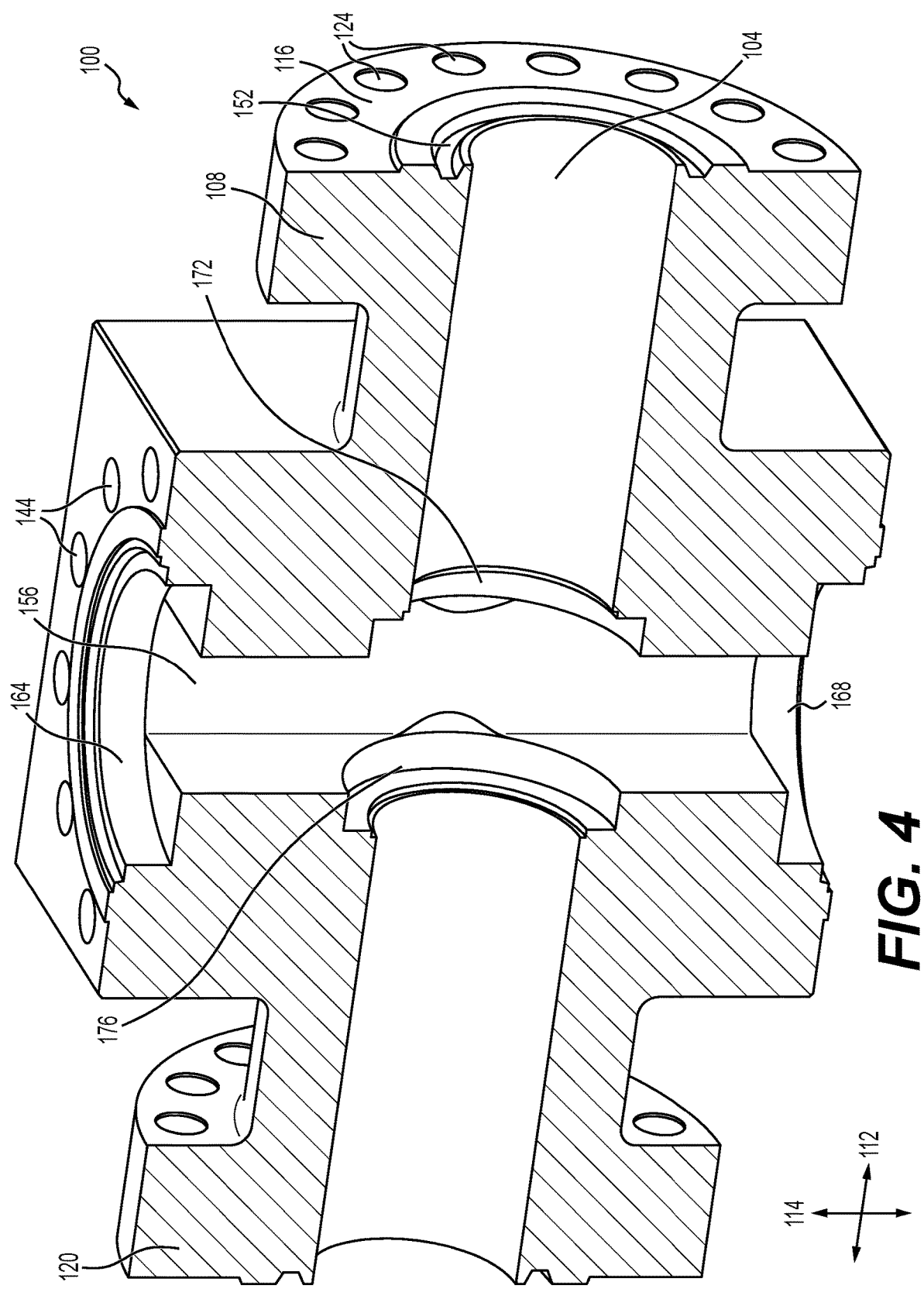
FIG. 4 is a schematic, perspective view with a portion shown in cross section of an illustrative embodiment of a dynamic slab gate valve.

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

In one exemplary embodiment, a dynamic gate valve has a valve body with a through-bore running the length of the gate valve. The through-bore being, typically, of circular cross section. The ends of the gate valve are connected to upstream and downstream tubulars, with fluid entering the gate valve from the upstream side and exiting the gate valve from the downstream side.

Flow is opened or closed by a gate. The gate is generally a slab with an opening in one area and a solid surface in another area. The gate resides within a cavity which bisects the through-bore and is able to be moved from an open position, in which the opening of the gate is in line with the through-bore, and a closed position, in which the solid surface of the gate blocks flow through the through-bore.

The gate is a dynamic gate that can translate a distance in the direction of the through-bore in response to fluid pressures exerted against the gate surface. The dynamic gate valve also has a dynamic skirt, which provides a seal between fluid flow areas of the valve and lubricated areas (or lubricated reservoirs or cavities) of the valve. The dynamic skirt, therefore, reduces cross-flow between through-bore fluids and lubricants, thereby reducing contamination of lubricants and loss of lubricants. The dynamic skirt is biased by a skirt energizer, so that the dynamic skirt is biased toward the gate to achieve a seal with a gate surface and to move in response to gate movement.

The dynamic gate valve may also include a dynamic seat, which provides a seal between the gate and the through-bore to prevent through bore fluid from flowing into operational areas of the valve. Part of the seal formed by the seat includes contact of a seat surface with the gate, which prevents through-bore fluid from flowing into lubrication areas. The seat is biased by an energizer toward the gate surfaces to increase the quality of this seal. In addition, the biasing force of the energizer results in movement of the seat toward the gate as the gate translates in the direction of the through-bore. Thereby, the seat dynamically moves with the movement of the gate, which moves in response to fluid pressures, to maintain the seal between the seat and the gate.

Referring now to the figures and primarily to FIGS. 1-4, an illustrative embodiment of a slab gate valve 100 is presented. The slab gate valve 100 has a through-bore 104, which is a circular bore through the length of a valve body 108, for allowing a fluid flow therethrough as desired. The through-bore 104 is oriented along the length of the valve body 108 in a first direction 112. The slab gate valve 100 is coupled to a pipe or other tubing, through which fluid may flow in the first direction 112 with a first flange 116 and a second flange 120. A pipe or other tubing is connected to the first flange 116 and the second flange 120 with bolts or studs using a plurality of bolt holes 124, so that fluid may flow through the through-bore 104 in the first direction 112. The valve body may be connected to a pipe via any attachment technique or device including, inter alia, the following: Welded Connection, Studded Connection, Hammer Union, Threaded Connection, Hub & Clamp Connection, and Collar Connection. The disclosure also includes a multi valve body comprising of one or more valves in a singular block body.

It should be noted that slab gate valve 100 may be bi-directional, but for convenience, is presented with flow in a single direction. A gasket pocket 152 is disposed within the end of each flange 116 and 120 so that a gasket may be inserted into the gasket pocket 152 to provide a fluid seal between the first flange 116 or the second flange 120 and an upstream or downstream pipe or tubing connection, e.g., a mating flange.

An upper bonnet 128 and a lower bonnet 132 are located on an upper side and a lower side, respectively, of the valve body 108. All relative directions, e.g., "upper" and "lower," are for the orientation shown in the figures. The upper bonnet 128 and the lower bonnet 132 are used to attach and contain a portion of a gate assembly 134 within the valve body 108. The gate assembly 134 is formed of a gate 136, an upper stem 140, and a lower stem 142. The upper bonnet 128 and the lower bonnet 132 are coupled to the valve body 108 with studs or bolts using a plurality of bolt holes 144. The upper stem 140 and the lower stem 142 extend from the centers of the upper and lower ends of the upper bonnet 128 and the lower bonnet 132, respectively. The upper stem 140 and the lower stem 142 are used to actuate the gate assembly 134 between an open and closed position.

A gate cavity 156 is a cavity within the valve body 108 that is oriented in a second direction 114 and that is perpendicular to and transects the through-bore 104. The gate cavity 156 is sized and configured to receive a gate assembly 134, and the gate cavity 156 may be further sized and configured to receive a dynamic shield assembly and may be optimized to minimize or reduce the volume of lubricant required. An upstroke lubricant cavity 164 and a downstroke lubricant cavity 168 are partially formed by cutouts from the valve body 108 at the upper and lower ends of the gate cavity 156. The upstroke lubricant cavity 164 and the downstroke lubricant cavity 168 are also partially formed by cutouts within the upper bonnet 128 and the lower bonnet 132, respectively. When the upper bonnet 128 and the lower bonnet 132 are assembled onto the valve body 108, the cutouts within the upper bonnet 128 and the valve body 108 and the cutouts within the lower bonnet 128 and the valve body 108 align to form the upstroke lubricant cavity 164 and the downstroke lubricant cavity 168, respectively. The connection between the upper bonnet 128 and the valve body 108 is sealed from fluid flow by an upper bonnet gasket 130. Likewise, the connection between the lower bonnet 132 and the valve body 108 is sealed from fluid flow by a lower bonnet gasket 138. The lower bonnet gasket 138 and the upper bonnet gasket 130 are made from suitable gasket material, such as any compressible material, for example any of the NBR type rubbers. Other examples include metallic, non-elastomeric materials (PTFE, MPTFE, PEEK, Graphite/re-enforced Graphite, or any combination of the above. Those skilled in the art will appreciate that other materials may be used as well.

The through-bore has a diameter 148, which is of sufficient size to allow for the desired flow through slab gate valve 100. In one embodiment the diameter 148 is in the range of 1 13/16" thru 7 1/16". Those skilled in the art will appreciate that other sizes may be used.

The upstream seat pocket 172 and the downstream seat pocket 176 are cavities within the valve body 108 within the through-bore 104 at the intersection of the through-bore 104 and the gate cavity 156. The upstream seat pocket 172 and the downstream seat pocket 176 are both configured to receive a dynamic seat assembly 180, which provides fluid and pressure seals between the seat assemblies 180 and the gate assembly 134. The upstream seat pocket 172 and the downstream seat pocket 176 are annular rings that are concentric with the through-bore 104.

As the slab gate valve 100 is operated between an open and a closed position, the gate assembly 134 moves back and forth along the second direction 114 within the gate cavity 156. This movement results in movement of the upper end of the gate 156 and the upper stem 140 through upstroke lubrication cavity 164 and movement of the lower end of gate 156 and the lower stem 142 through downstroke lubrication cavity 168. In the course of this movement, the gate 156, the upper stem 140, and the lower stem 142 are lubricated by lubricants within upstroke lubrication cavity 164 and downstroke lubrication cavity 168. A dynamic skirt assembly 244, which is discussed in more detail below, acts as a barrier to prevent excessive exchange of lubricants and fluids between the through-bore 104 and the downstroke lubrication cavity 168 and the upstroke lubrication cavity 164 during the opening and closing process.

Figure 5:
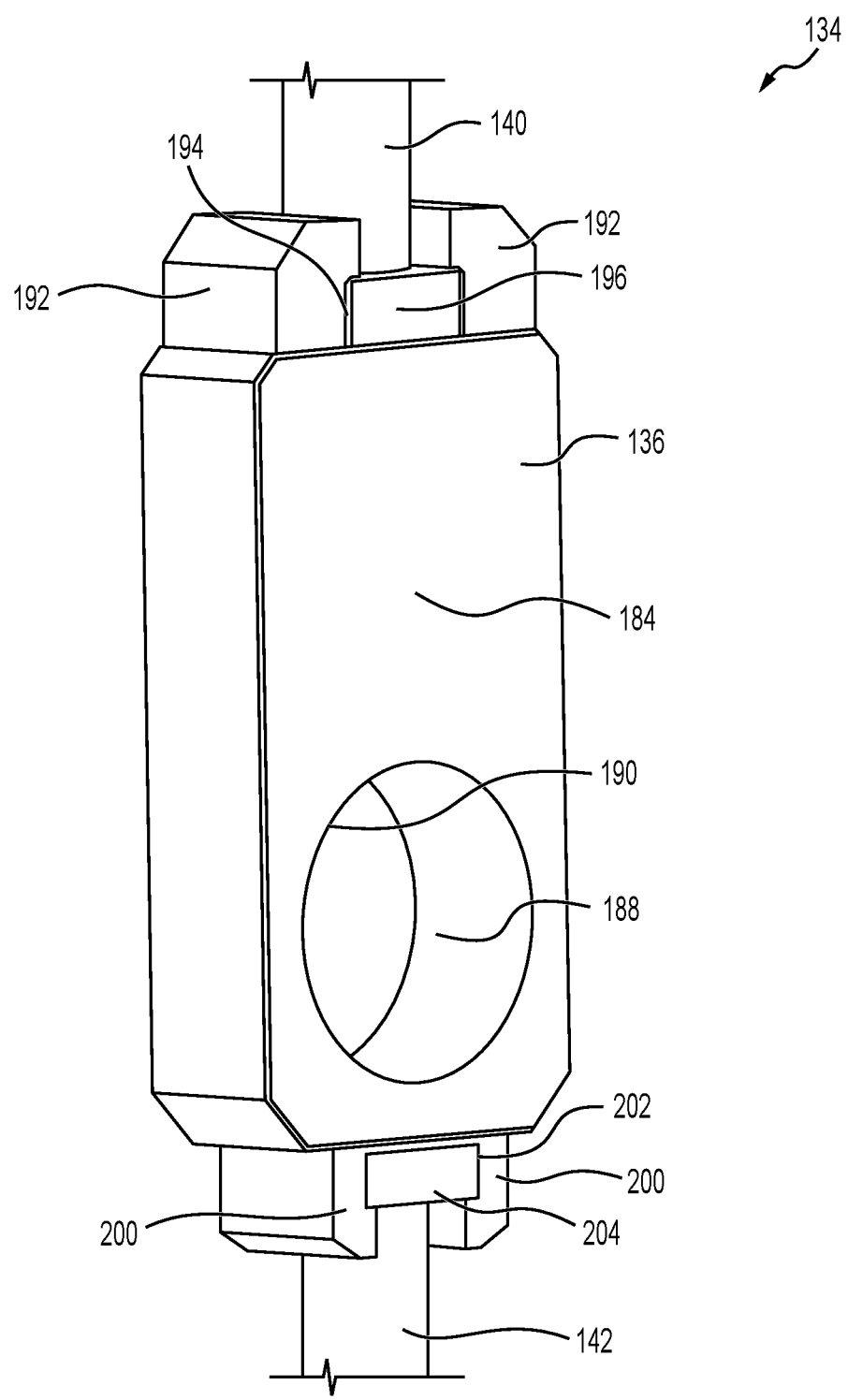
FIG. 5 is a schematic, perspective view of a slab gate and valve stems of an illustrative embodiment of a dynamic slab gate valve.

Referring now primarily to FIG. 5, an illustrative embodiment of the gate assembly 134 is presented. The gate assembly 134 contains the gate 136, the upper stem 140, and the lower stem 142. The gate 136 has a closed portion 184 and an open portion 188. The open portion 188 contains a circular cutout or flow aperture 190 to allow for flow through the gate 136. When the gate 136 is in the open position, the open portion 188 is in line with and concentric to the through-bore 104. The closed portion 184 is solid to prevent flow through the gate 136. When the gate 136 is installed into the slab gate valve, such as slab gate valve 100, and is in the closed position, the closed portion 184 of gate 136 is in line with and blocks flow though the through-bore 104 of the slab gate valve 100. When gate 136 is installed into a valve, such as slab gate valve 100, and is in the open position, the open portion 188 of gate 136 is in line with and allows for flow though the through-bore of the slab gate valve 100. In the depicted embodiment, the closed portion 184 is depicted as being above the open portion 188. In other embodiments, this relationship between the closed portion 184 and the open portion 188 can be reversed so that closed portion 184 is below open portion 188.

An upper end of the gate 136 is configured to receive the upper stem 140. Shoulders 192 may be formed on the upper end of the gate 136. The shoulders 192 are configured to form a t-slot for receiving a portion of the upper stem 140, namely a tee 196. The lower end of the upper stem 140 has the tee 196. The upper stem 140 is coupled to and captured by the gate 136 by sliding the tee 196 of the upper stem 140 into the tee slot 194 formed by the shoulders 192. This configuration allows for the gate 136 to be captured by the upper stem 140 so that the movement of the upper stem 140 within slab gate valve 100 in the first direction 112 of the gate cavity 156 causes the gate 136 to move along with the upper stem 140, therefore allowing upper stem 140 to be used to move the gate 136 between a closed and open position within the slab gate valve 100.

The lower end of the gate 136 is similarly configured with shoulders 200 forming a tee slot 202 for receiving a tee 204. In this way the gate 136 receives the lower stem 142, so that the lower stem 142 may also be used to move the gate 136 between an open and closed position within a valve.

While, in this embodiment the tee and t-slot connection between gate 136 and upper stem 140 and gate 136 and lower stem 142 is formed with the tee portion on the upper stem 140 and on the lower stem 142 and the t-slot portions on the gate 136, in other embodiments this relationship can be reversed so that the tee portions are formed on the gate 136 and the t-slot portions are formed on the upper stem 140 and the lower stem 142. In other embodiments, the gate assembly 134 has only one stem connection, which may be either an upper stem or lower stem.

The tee 196 and the tee 204 allow for movement in the first direction 112 (flow direction) of the gate 136 relative to the upper stem 140 and the lower stem 142 to accommodate for pressures applied to the gate 136 when the gate 136 is in use in a valve, such as slab gate valve 100.

Referring now primarily to FIGS. 6 and 7, an illustrative embodiment of the dynamic seat assembly 180 of a slab gate valve 100 is presented. FIG. 6 depicts a perspective view with a portion in cross section of the dynamic seat assembly 180. FIG. 7 depicts a cross sectional view of the dynamic seat assembly 180 taken at the cross-section location 228 (FIG. 6). When installed within the slab gate valve 100, the dynamic seat assemblies 180 are disposed within an upstream seat pocket 172 and a downstream seat pocket 176.

The embodiment of the dynamic seat assembly 180 depicted in FIGS. 6 and 7 has a seat 208, a first debris ring 212, a second debris ring 216, a seat seal 220, and a seat energizer 224. The seat 208 fits with a seal pocket (see 172 and 176 in FIG. 4). The first debris ring 212 may be disposed at least partially in the first debris ring slot or shoulder 226. The second debris ring 216 may be disposed at least partially within a second debris ring shoulder or slot 230. The seat energizer 224 may be disposed at least partially in a seat energizer slot of the shoulder 232, which also may be referred to as a seat energizer cavity, and may be adjacent to a portion of the first debris ring 212. The seat 208 has a cylindrical body with an inner through-bore. The seat 208 has an inner portion 235 and outer portion 236, or perimeter.

The first debris ring 212 and the second debris ring 216 each provide a debris seal between the valve body 108 and the seat 208. The first debris ring 212 is perforated by the perforations 232 to allow pressure through the first debris ring 212, while preventing large particles from passing through the seal. The perforations may be in the range of 063 inches or smaller and may be formed by machining via drill, waterjet, laser cutter, or other technique. The second debris ring 216 may have no perforations and may be sized to maintain a space between the seat 208 outside diameter and the valve body seat pocket 176 ID. The space is designed to prevent even smaller material from entering the seal area 220/237. The gap may be in the range of 0.003" or smaller.

In addition, fluid may flow past first debris ring 212 and the second debris ring 216 in the space between first debris ring 212 and the second debris ring 216 and the valve body 108 or seat 208. The first debris ring 212 or the second debris ring 216 can serve a dual role as a bearing and as a device to prevent debris from reaching seat seal 220. In some embodiments, the dynamic seat assembly 180 may have only one debris ring. In some embodiments, the first debris ring 212 and the second debris ring 216 are not perforated.

The first debris ring 212 and second debris ring 216 are configured to exclude the passage particles and debris of a certain size past the first debris ring 212 or the second debris ring 216. The minimum size of the particles excluded by the first debris ring 212 is larger than that excluded by the second debris ring 216. Therefore, the first debris ring 212 acts as a first pass particulate filter and the second debris ring 216 acts as a second pass particulate filter, which removes finer particles than are removed by the first debris ring 212. In some embodiments the first debris ring 212 prevents debris in fluids that are flowing through the through-bore 104 that are 0.063" in diameter or larger from passing the first debris ring 212. In some embodiments, the second debris ring 216 prevents debris in fluids that are flowing through the through-bore 104 that are 0.002"-0.003" in diameter from passing the second debris ring. Those skilled in the art will appreciate that other sizes of apertures may be used.

The first debris ring 212 and second debris ring 216 may be made from many materials, e.g., PEEK (polyetheretherketone) material (or other suitable plastic) or metals. In one embodiment, the debris rings 212, 216 are made from graphite or re-enforced graphite.

The connection between the dynamic seat assembly 180 and the valve body 108 is sealed, at least in part, from fluid and gas flow by the seat seal 220. The seat seal 220 is disposed within a seat seal cavity 237, which is formed in an exterior or outer perimeter of the seat 208. When the dynamic seat assembly 180 is installed within the upstream seat pocket 172 (FIG. 4) or the downstream seat pocket 176, the seat seal forms a liquid and gas tight seal to prevent or at least substantially restrict fluid and gas flow.

The seat seal 220 can be either non-elastomeric material like polytetrafluoroethylene (PTFE), modified polytetrafluoroethylene (MPTFE), polyetheretherketone (PEEK), graphite/re-enforced graphite, or metal or a combination or made of an elastomer like that used for O-rings, e.g., hydrogenated nitrile butadiene rubber (HNBR), nitrile butadiene rubber (NBR), fluo Kohlenstoff material (FKM), perfluoroelastomers (FFKM), etc. The seat seal 220, the first debris ring 212, the and second debris ring 216 can vary with different applications. In one embodiment, the seat seal 220 is about ¼ inch in width, 9 inches in diameter, and ⅛ deep.

The dynamic seat assembly 180 also may include a tooling cutout 240. The tooling cutout 240 allows for a tool to be inserted into the tooling cutout 240 for prying the dynamic seat assembly 180 from the upstream seat pocket 172 or the downstream seat pocket 176.

Figure 8:
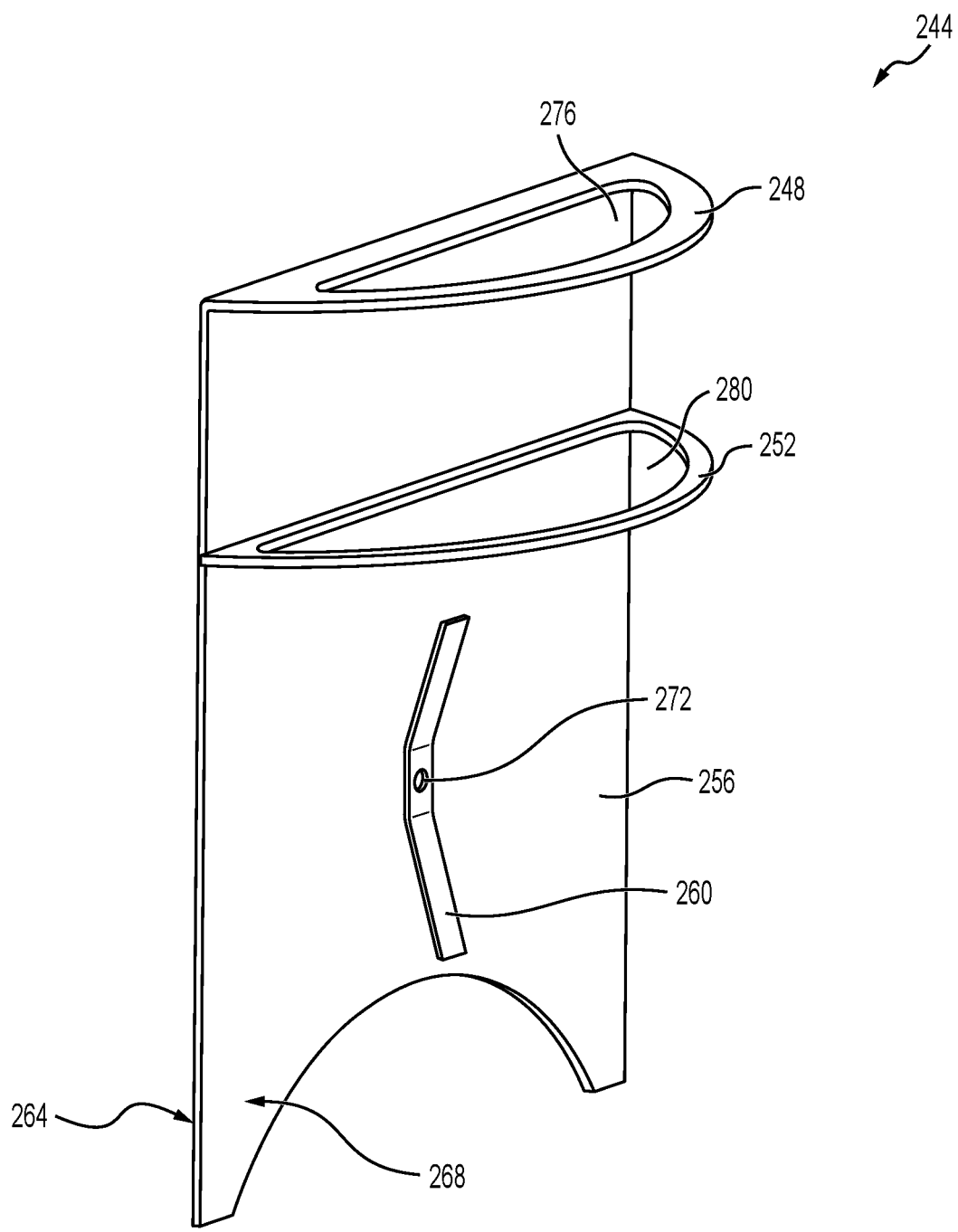
FIG. 8 is a schematic perspective view of a dynamic skirt assembly of an illustrative embodiment of a dynamic slab gate valve.

Referring now primarily to FIG. 8, an illustrative embodiment of a dynamic skirt assembly 244 of a dynamic slab gate valve, such as slab gate valve 100 is presented. The dynamic skirt assembly 244 may include a first lubricant guide 248, and may include a second lubricant guide 252, a skirt plate 256, and a skirt energizer 260. The skirt plate 256 has a first side 264 that when assembled is closest to the gate 136 (FIG. 3) and has a second side 268 that when assembled is furthest from the gate 136, when installed into slab gate valve 100. The first side 264 of the skirt plate 256, when installed in slab gate valve 100, faces the gate 136 within the valve to provide a sealed surface between the skirt plate 256 and the gate 136 to prevent excessive grease and fluid flow between such seal. The second side 268 of the skirt plate 256 faces a portion of the valve body 104 (see FIG. 3.). The skirt energizer 260 is coupled to the skirt plate 256 on the second side 268. In the depicted embodiment, this coupling may be made by a spot weld 272. Other coupling methods, such as screws, weld-stud, or a nut and bolt or other fasteners may be used for this coupling. The skirt energizer 260 may be coupled vertically (for orientation shown) as shown in FIG. 8 or horizontally (i.e., a third direction 115 in FIG. 3). The first lubricant guide 248 and the second lubricant guide 252 extend from the second side 268 of the skirt plate 256 and are shaped to conform with the shape of lubricant pockets of a valve, such as downstroke lubricant cavity 168 of FIG. 2. The first lubricant guide 248 and the second lubricant guide 252 have openings 276 and 280, respectively to allow lubrication, such as grease to flow through the openings 276 and 280. The lubricant guide 248, 252 may be welded, bolted, mechanically attached, or formed directly to the skirt plate 256. A lower portion of the skirt plate 256 may be formed with or without a cutout 258, e.g., an arcuate cutout as shown.

FIGS. 9, 10A, 10B, and 10C depict the operation of a representative embodiment of a dynamic skirt assembly 244 of a slab gate valve 100. As depicted in the proceeding figures, the dynamic skirt assembly 244 is located within the slab gate valve 100 and in particular is partially disposed between the gate 136 and a valve body 108 and partially disposed between a lower stem 142 and the valve body 108. A portion of the dynamic skirt assembly 244 is also disposed within the downstroke lubricant cavity 168, the downstroke lubricant cavity 168 being formed from cavities in the valve body 108 and in a lower bonnet 132 and, when the slab gate valve 100 is in use, being filled with a lubricant, such as grease. The dynamic skirt assembly 244 is comprised of the skirt plate 256 and a skirt energizer 260, with the side of the dynamic skirt assembly 244 having the skirt energizer 260 facing the valve body 108 so that the skirt energizer 260 is in contact with the valve body 108 and the skirt energizer 260 biases the dynamic skirt assembly 244 away from the valve body 108, therefore, creating cavity 284 between the skirt plate 256 and the valve body 108. The force of the skirt energizer 260 also biases the other side of the skirt plate 256 toward the gate 136 and the lower stem 142, thereby creating a seal between the skirt plate 256 and the gate 136 or the lower stem 142. In one illustrative embodiment the skirt energizer 260 is a metal spring formed with angled ends that have a free position lifted off the skirt plate 256. Other types of energizers may be used or wire-type (coiled or bent) compression, conical, leaf, Belleville, grater, disc type energizers that may be made from rubber, plastic, metal, or another material.

Figure 9:
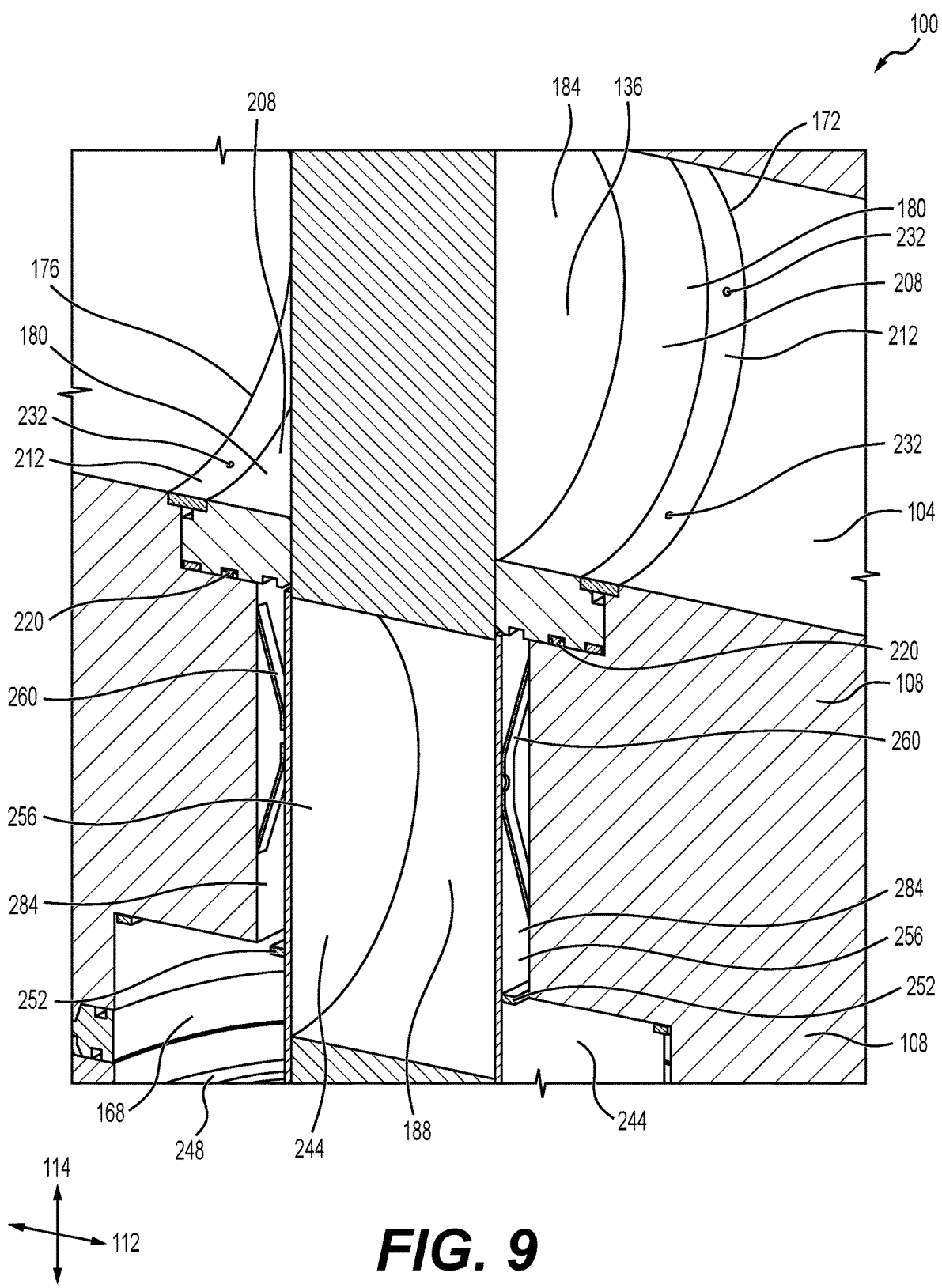
FIG. 9 is a schematic, perspective view with a portion shown in cross section of an illustrative embodiment of a dynamic slab gate valve.

As depicted in FIG. 9, fluid pressure in the through-bore 104 creates a pressure force against the upstream side of the gate 136. As described above in relation to FIG. 5, the connection between the gate 136 and lower stem 142 and the gate 136 and the upper stem 140 is a dynamic connection where the gate 136 can translate in the first direction 112 along the length of the through-bore 104 in response to pressure forces from fluids within the through-bore 104. Therefore, when the gate 136 is in the closed position, upstream fluid pressure pushes against the gate 136, which results in translation of the gate 136 in the first direction 112, as the tee slides relative to the associated slot (see FIG. 5).

The dynamic skirt assembly 244 is intended to provide a good seal between the fluid and debris flowing through the through-bore 104 and the lubricant located in the downstroke lubricant cavity 168. A poor seal between the gate 136 and the skirt plate 256 or between the lower stem 142 and the skirt plate 256 results in the entry of through-bore fluids and debris into the downstroke lubricant cavity 168 and for the loss of lubricant into the through-bore 104, both of which result in decreased efficiency and operation of the slab gate valve 100. The potential for such to happen is particularly an issue during opening and closing operations of the slab gate valve 100.

Figure 10A:
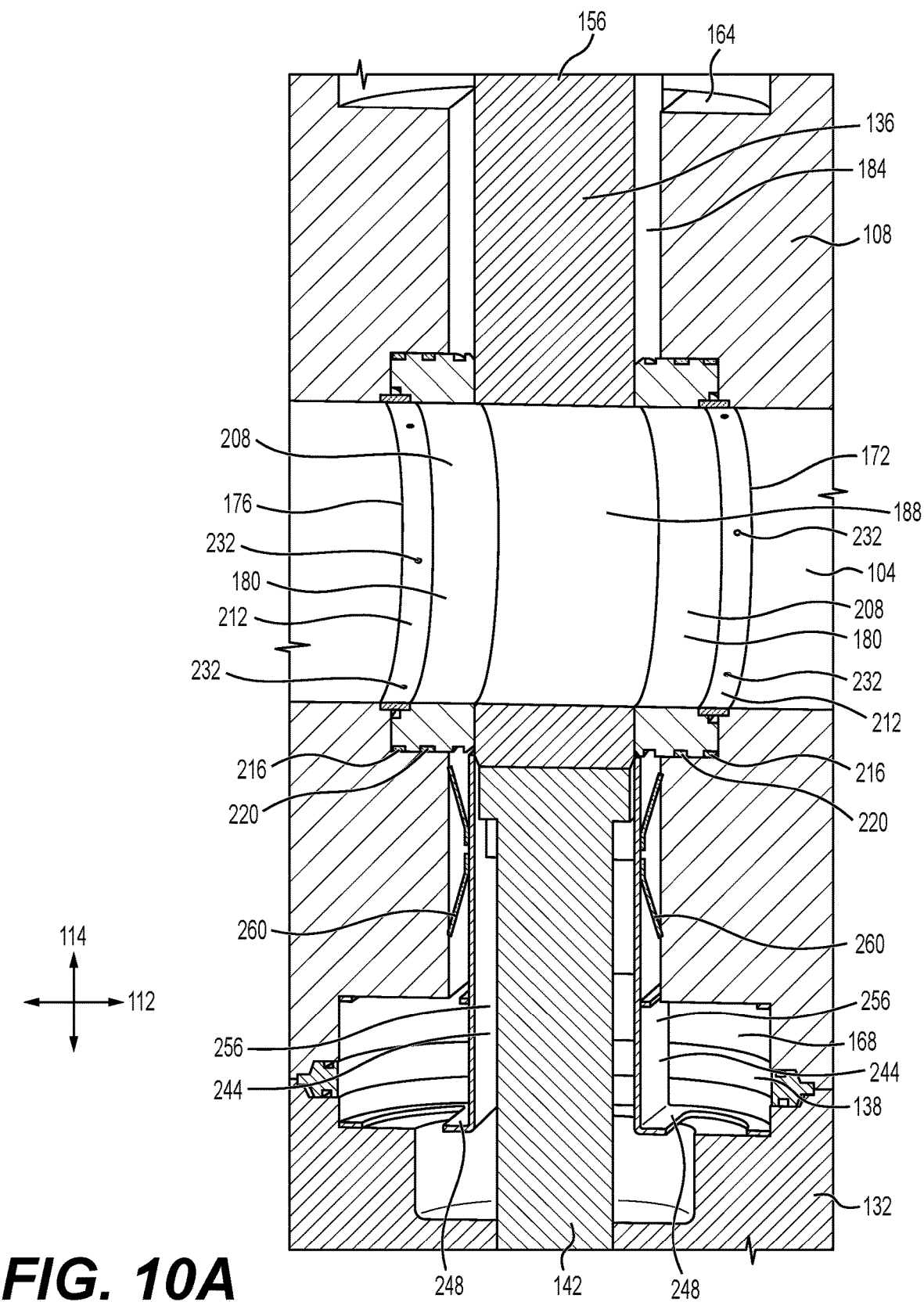
FIG. 10A is a schematic, cross sectional view of an illustrative embodiment of a dynamic slab gate valve in an open position.
Figure 10B:
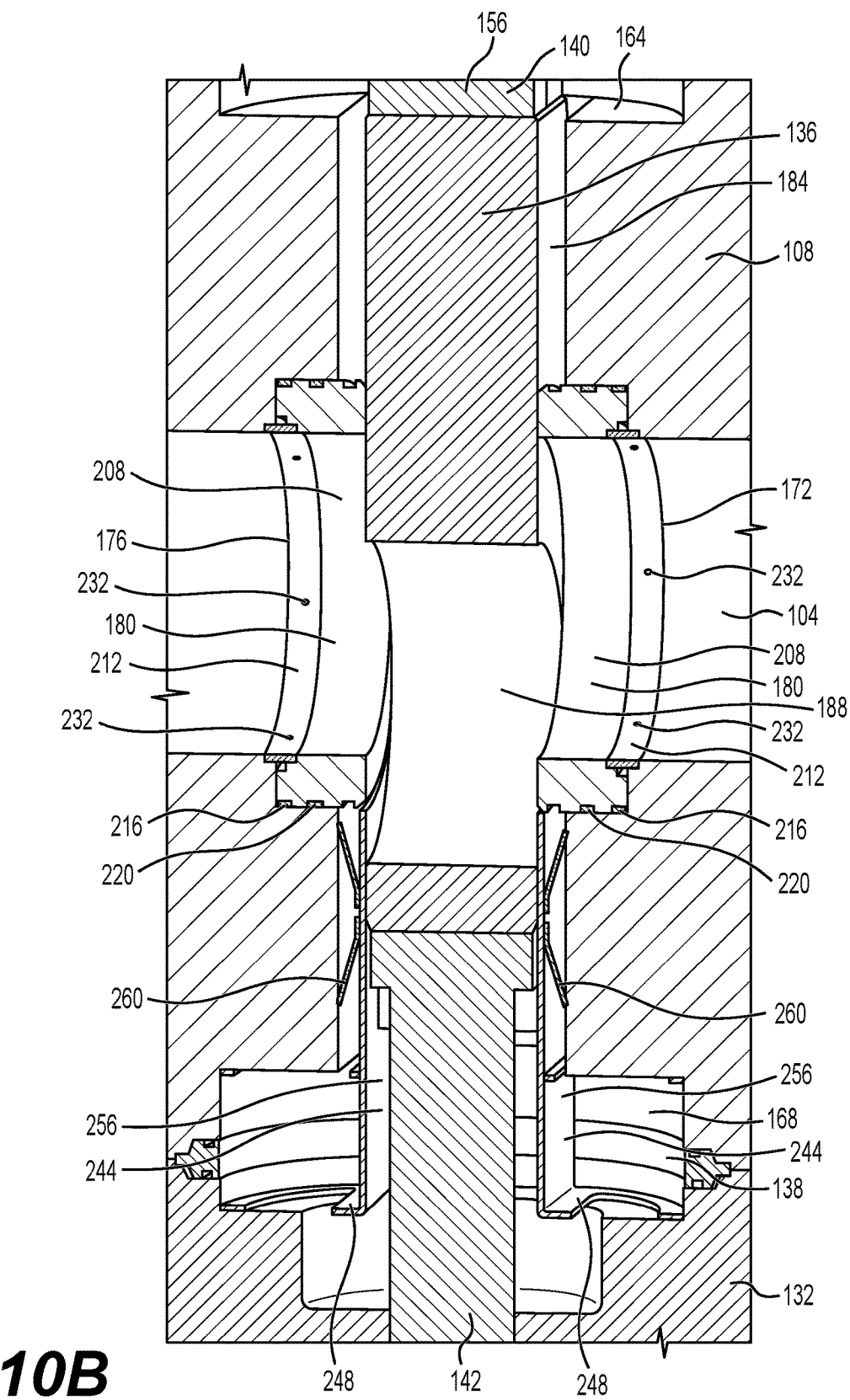
FIG. 10B is a schematic, cross sectional view of an illustrative embodiment of a dynamic slab gate valve in a half position.
Figure 10C:
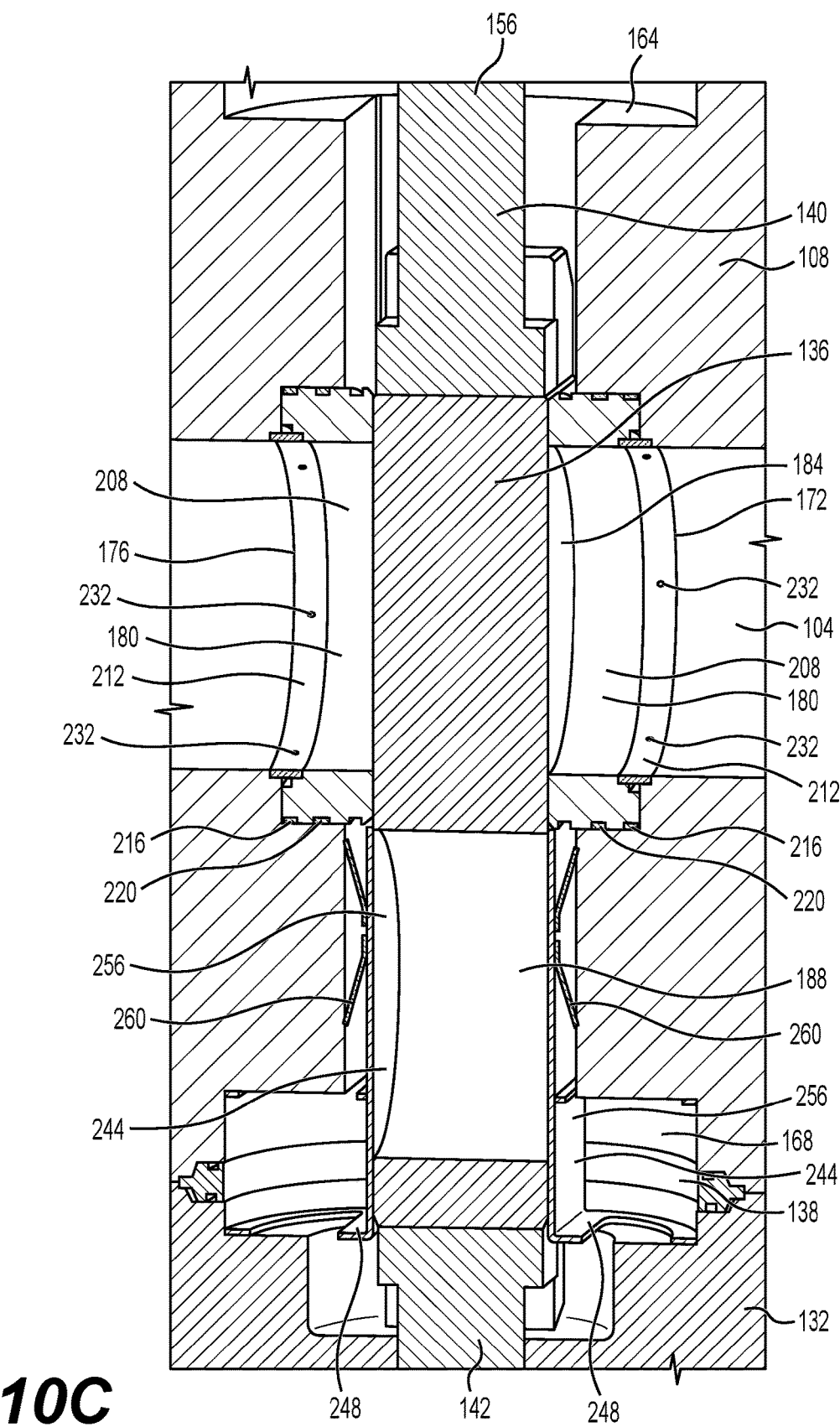
FIG. 10C is a schematic, cross sectional view of an illustrative embodiment of a dynamic slab gate valve in a closed position.

Referring now primarily to FIGS. 10A, 10B, and 10C, an illustrative embodiment of a slab gate valve in various positions (an open position, a partially open position, and a closed position, respectively) is presented. When the gate 136 is in the open position, fluid is flowing through the through-bore 104 and the open portion 188 of the gate 136. As the gate 136 is moved toward a closed position (see, e.g., the intermediate position in FIG. 10B), the open portion 188 of the gate 136 moves lower into the gate cavity 156 and eventually, once the closed position (see, e.g., FIG. 10C) is reached, is totally located below the through-bore 104 and is not in fluid communication with the through-bore 104. However, during the closing process, fluid that is located within the open portion 188 of the gate 136 is trapped within the opening 188 and remains trapped within the open portion 188 when the gate 136 is in the closed position.

Without the skirt plate 256 in place as depicted in FIG. 10C, the trapped fluid in the open portion 188 can commingle and mix with the lubricant located in the downstroke lubricant cavity 168. This results in the introduction of through-bore fluids and debris into the downstroke lubricant cavity 168, which contaminates and reduces the effectiveness of the lubricant. In addition, this results in the dilution and washout of lubricant from the downstroke lubricant cavity 168, with lubricant moving into the open portion 188, where the lubricant serves no effective purpose.

The existence of the skirt plate 256 assists in reducing the introduction of through-bore fluids and debris into the lubricant and the loss of lubricant from the lubricant pocket, or cavity. The skirt plate 256 provides a physical barrier to reduce or prevent this exchange.

However, to prevent this exchange and loss, a reliable seal between the skirt plate 256 and the gate 136 or the lower stem 142 is needed. Also, as discussed above, the gate 136 is a dynamic gate that moves in the first direction 112 in response to through-bore 104 fluid pressure. In this situation, a static skirt plate is inadequate. In the case of a static skirt plate, the skirt plate and a gate that make contact when fluid pressure is not applied to the gate do not make sufficient contact when fluid pressure causes the gate to move in the downstream direction.

The dynamic skirt assembly 244 addresses this deficiency. The skirt energizer 260 provides a biasing force between the valve body 104 and the skirt plate 256. This biasing force results in a tighter, closer seal with the gate 136. Furthermore, as the gate 136 is moved in the first direction 112 by fluid pressures, the biasing force of the skirt energizer 260 causes the skirt plate 256 to move in conjunction with the gate 136, which in turn results in maintaining good contact and seal between the gate 136 and the skirt plate 256. This, in turn, reduces the amount of through-bore fluid that enters the downstroke lubrication cavity 168 and the amount of lubricant that is lost into the open portion 188 of the gate 136.

While in the depicted embodiments of the slab gate valve 100, the open portion 188 of the gate 136 is above the closed portion 184 of the gate 136, and the gate 136 is moved from an open position to a closed position by moving the gate 136 in the second direction 114 towards the downstroke lubricant cavity 168. The direction of movement and the location of the open portion 188 relative to the closed portion 184, as described, is for reference in relation to the embodiments as depicted. For example, a reversal of the relative positioning of the open portion 188 to the closed portion 184 and a reversal of the movement of the gate 136 from the open position to the closed position, would describe the embodiments depicted in FIGS. 2 and 3, if the embodiments of FIGS. 2 and 3 were inverted.

Referring now again primarily to FIG. 9, which also depicts the function of the dynamic seat assembly 180, the dynamic seat assemblies 180 are disposed within upstream seat pocket 172 and downstream seat pocket 176 of the slab gate valve 100. As discussed above, the connection between the upper stem 140 and the gate 136 and the connection between the lower stem 142 and the gate 136 is a tee and t-slot type connection, which allows for the gate 136 to move in first direction 112 in response to fluid pressure of fluids within through-bore 104. Contact between the gate 136 and the side of the dynamic seat assembly 180 that is adjacent to the gate 136 provides a seal to prevent through-bore fluids from transferring into the portions of the gate cavity that are above and below the level of the through-bore 104 within the valve body 108, such as the upstroke lubricant cavity 164 and the downstroke lubricant cavity 168. As discussed above fluid communication between the upstroke lubricant cavity 164 and the through-bore 104 or between the downstroke lubricant cavity 168 and the through-bore 104 results in loss of lubricant from the downstroke lubricant cavity 168 or the upstroke lubricant cavity 164 and in contamination of the fluids within through-bore 104.

A static seat assembly, may provide such a seal when fluid pressure is not applied to a gate of valve. However, as the gate moves in response to fluid pressures, the seal between the gate and a static seat assembly is lost because the movement of the gate results in a gap between the gate and the seat assembly.

The use of the dynamic seat assembly 180 addresses this issue. The dynamic seat assembly 180 includes a seat energizer 224, which, when installed in the slab gate valve 100, is disposed between the seat 208 and the valve body 108. The seat energizer 224 provides a biasing force that urges the seat 208 towards the gate 136. The seat energizer may be any suitable energizer capable of providing a biasing force between the valve body 108 and the seat 208. In some embodiments the energizer is a wave spring. Other types of energizers may be wire type (coiled or bent) compression, conical leaf, Belleville, grater, disc-type, which may all be made from rubber, plastic, material or another material.

This biasing force from the seat energizer may result in better seal quality between the seat 208 and the gate 136. In addition, as the gate 136 is pushed in a downstream direction, the biasing force of the seat energizer 224 causes the seat 208 to move in conjunction with the gate 136 and, therefore, maintain a seal between the seat 208 and the gate 136.

As used herein, "seal" means a substantial restriction of fluids or other substances; for example, in one example, a seal means less than 0.5% of fluid (gaseous, solid, or liquid) flowing gets by the seal.

Figure 11:
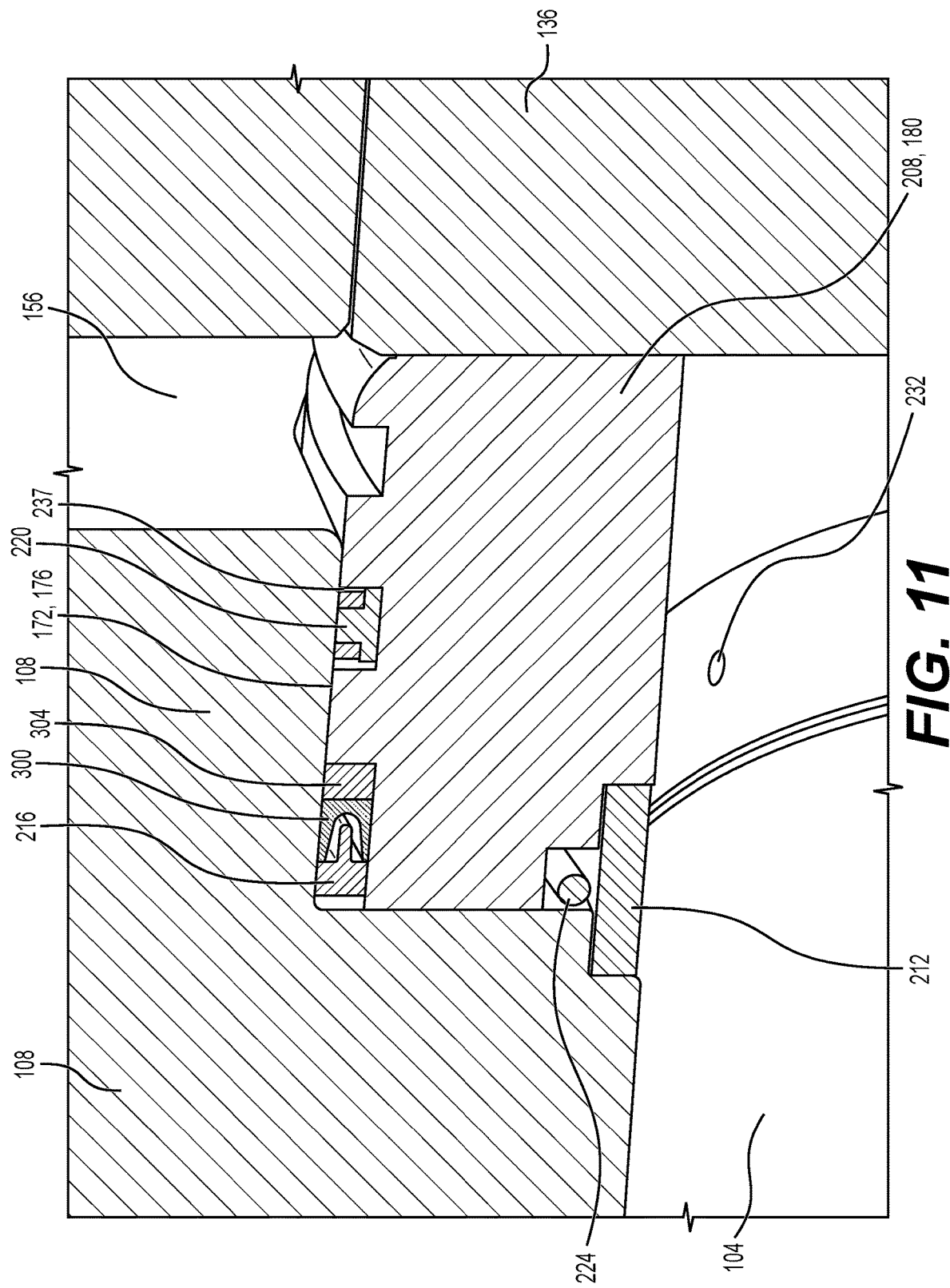
FIG. 11 is a schematic, perspective view with a portion shown in cross section of a portion of an illustrative embodiment of a dynamic slab gate valve.

Referring now primarily to FIG. 11, a portion of an illustrative embodiment of a dynamic slab gate valve is shown. In the depicted embodiment, an alternative sealing configuration is depicted regarding the seal between the valve body 108 and the seat 208. Like in the previously described embodiments, the seat assembly 180 is disposed within a seat pocket, which may be an upstream seat pocket 172 or downstream seat pocket 176. The seat assembly 180 has a seat 208, a first debris ring 212, and a seat seal 220. The seat seal 220 is disposed within the seat seal cavity 237. The seat seal 220 is formed from an elastomeric material that forms a seal between the seat 208 and the valve body 108. The contact seals between the seat seal 220, the seat 208, and the valve body 108 act as a liquid seal, a gas seal, and a pressure seal. The first debris ring 212 may have perforations 232, which function as described above in relation to other embodiments to prevent the travel of debris from fluid flowing in the through-bore 104. The seat assembly 180 also has a seat energizer 224, which functions as described above to bias the seat 208 toward the gate 136.

The seat assembly 180 also has a second debris ring 216, a u-seal 300, and a u-seal backer 304. The u-seal 300 is formed from a material that does not allow gas permeation through the u-seal 300. In some embodiments, the u-seal 300 is non-elastomeric. In some embodiments, the u-seal 300 is made from PTFE or PEEK. The u-seal 300 is formed so that a cross section of the u-seal 300 has a u-shaped profile, so that one side of the u-seal forms a cup or cavity. The u-seal 300 is installed within the seat assembly 108 so that the cup or cavity side of the u-seal faces the direction of fluid flow from the first debris ring 212 toward the second debris ring 216. As fluid flows past the second debris ring 216 and to the u-seal 300 (left to right for the orientation shown), the cup or cavity portion of u-seal 300 is filled with fluids, which are under pressure. The fluid pressure is then exerted on the inside wall of the u-shaped seal 300, which in turn causes the walls of the u-seal 300 to expand toward the valve body 108 and the seat 208. The force of the fluid pressure pushing the walls of the u-seal 300 against the valve body 108 and the seat 208 results in a liquid and gas tight seal between the u-seal 300 and the valve body 108 and the u-seal 300 and the seat 208. The higher the pressure that is exerted on the u-seal 300, the tighter the seal becomes.

In the depicted illustrative embodiment, the second debris ring 216 is formed with a prong that is designed to fit within and conform to the cup or cavity shape of the u-seal 300. In these embodiments, the prong of the second debris ring 216 prevents undesired deformation of the u-seal 300 when pressure is applied to the u-seal 300 or directs the proper expansion of the walls of the u-seal 300 when fluid pressure is applied within the cup or cavity portion of the u-seal 300. In some embodiments, the second debris ring 216 is able to slide in response to fluid pressure so that the prong portion of the second debris ring 216 is forced into the cup or cavity portion of the u-seal 300 and makes contact with the u-seal to promote the proper expansion of the walls of the u-seal when pressure is applied, as described above.

The illustrative embodiment of FIG. 11 may provide certain advantages. In particular, it is often necessary to form the seat seal 220 from an elastomeric material. This ensures that seat seal 220 can flex and conform to maintain a liquid and gas seal between the seat seal 220 and the valve body 108 and between the seat seal 220 and the seat 180. However, the use of elastomeric seals in oil and gas operations potentially suffers from a fault. In particular, elastomeric materials that are suitable for forming the gas and liquid seals described are vulnerable to gas permeation. As gas pressure is applied to the elastomeric material, the gas is forced into and permeates through the elastomeric material. In applications in the oil and gas industry, the source of such gas can be gasses flowing through a pipeline or can be dissolved gasses present in fluids that are flowing through a pipeline.

In either case, since the seat seal 220 is often formed of an elastomeric material, while the seat seal 220 provides a reliable contact seal to prevent liquid and gas flow, it is subject to the possibility of gas flow through the seal 220 by permeation and release with pressure changes. This results in gas flow past the seat seal 220 and into gate cavity 156, which is not desired.

On the other hand, many non-elastomeric materials, such as PTFE, PEEK, and other plastics, are not subject to gas permeation. By making u-seal 300 from such a non-elastomeric material the amount of gas that seat seal 220 is exposed to can be eliminated or decreased. The u-seal 300 may be made from a non-permeable material and is located upstream from the seat seal 220. When pressure is applied on the insides of the walls of the u-seal within the cup or cavity portion of the u-seal 300, the walls of the u-seal 300 are pushed tight against the valve body 108 and the seat 208. This results in a seal that is able to prevent or reduce gas and fluid flow between these components. In addition, since the u-seal 300 is formed from a non-permeable material, gas is unable to flow through the body of the u-seal 300 or permeate the u-seal 300. By this configuration, the amount of gas, which may permeate through the seat seal 220 or that contacts the seat seal 220 is reduced or eliminated.

The u-seal backer 304 is an elastomeric or non-elastomeric component that is located adjacent to u-seal 300 and between the u-seal 300 and the valve body 108 toward the seat seal 220. In some embodiments, the u-seal backer 304 provides additional structural support to prevent undesired deformation of the u-seal 300. In some embodiments, the u-seal backer provides a further backup seal to prevent fluid and gas flow past the u-shaped backer 304. In some embodiments, u-seal backer 304 is omitted.

There are many examples of the various embodiments described herein. A number of examples also follow.

Example 1. A dynamic slab gate valve comprising:
a valve body having a through bore through the length of the valve and formed with a gate cavity oriented transverse to and intersecting with the through bore;
a gate located within the gate cavity operable to move linearly in the direction of the gate cavity between an open position and a closed position;
a seat assembly disposed proximate the through bore, the seat assembly having a proximate side oriented toward the gate cavity so that the seat assembly contacts the gate when the gate is in the closed position and having a distal side on an opposite end from the proximate side;
the seat assembly comprising at least one seal, a seat, and a seat energizer, wherein the seat energizer is located on the distal side of the seat assembly and biases the seat assembly away toward the gate; and
wherein the seat assembly is sized and configured to translate in the direction of the through bore in response to pressure from the seat energizer.

Example 2. The dynamic slab gate valve of Example 1, further comprising at least one stem coupled to the gate wherein movement of the gate is actuated by movement of the at least one stem.

Example 3. The dynamic slab gate valve of Example 2, wherein the at least one stem comprises an upper stem and a lower stem wherein the upper stem is coupled to an upper side of the gate and the lower stem is coupled to a lower side of the gate.

Example 4. The dynamic slab gate valve of Example 3, wherein the gate can displace in the direction of the through bore relative to the upper stem and the lower stem in response to fluid pressures.

Example 5. The dynamic slab gate of Example 1, further comprising a lubricant pocket wherein a seal between the gate and the seat blocks fluid flow between the lubricant pocket and the through bore.

Example 6. The dynamic slab gate of Example 1, wherein the seat assembly further comprises at least one sediment blocker.

Example 7. The dynamic slab gate of Example 6, wherein the at least on sediment filter comprises a large sediment filter and a fine sediment filter.

Example 8. A dynamic slab gate valve, comprising:
a valve body having a through bore through the length of the valve and a gate cavity oriented transverse to and bisecting the through bore;
a gate located within the gate cavity operable to move in the direction of the gate cavity between an open position and a closed position;
a stem connected to a proximate end of the gate;
a lubricant pocket disposed within the valve body in fluid communication with at least a portion of the stem and a portion of the gate;
a skirt assembly at least partially disposed between the valve body proximate the gate cavity and the gate and at least partially disposed between the stem and the lubricant pocket;
wherein the skirt assembly comprises a skirt and a skirt biasing energizer;
wherein the skirt biasing energizer biases the skirt away from a portion of the valve body and toward the gate.

Example 9. The dynamic slab gate valve of Example 8, wherein movement of the gate is actuated by movement of the stem.

Example 10. The dynamic slab gate valve of Example 8, wherein the gate can displace in the direction of the through bore relative to the stem.

Example 11. The dynamic slab gate valve of Example 10, wherein a seal between the skirt plate and the gate prevents fluid communication between the through bore and the lubricant pocket.

Example 12. The dynamic slab gate valve of Example 11, wherein the skirt biasing energizer biases the skirt plate toward the gate to maintain the seal between the skirt plate and the gate.

Example 13. A dynamic seat assembly for a gate valve comprising:
at least one seal,
a seat, and
a biasing energizer,
wherein, when installed in a gate valve, the biasing energizer biases the seat assembly toward a gate of the gate valve.

Example 14. The dynamic seat assembly of Example 13, wherein contact between the gate and the seat assembly reduces fluid communication between a through bore of the gate valve and a lubrication cavity of the gate valve.

Example 15. The dynamic seat assembly of Example 13, further comprising at least one sediment filter.

Example 16. The dynamic seat assembly of Example 15, wherein the at least one sediment filter comprises a large sediment filter and a fine sediment filter.

Example 17. A skirt assembly for a gate valve, comprising:
a skirt plate, and
a skirt energizer coupled to one side of the skirt plate,
wherein, when installed in a gate valve, the skirt energizer biases the skirt plate toward a gate of a gate valve.

Example 18. The skirt assembly of Example 17, wherein the skirt assembly further comprises at least one lubricant guide coupled to the one side of the skirt plate.

Example 19. The skirt assembly of Example 17, wherein the skirt biasing energizer biases the skirt plate toward the gate when the gate translates in the direction of a through bore of the gate valve in response to fluid pressure.

Example 20. A dynamic slab gate valve comprising:
a valve body having a through bore through the length of the valve and a gate cavity oriented transverse to and intersecting with the through bore;
a gate located within the gate cavity operable to move in the direction of the gate cavity between an open position and a closed position;
a seat assembly disposed proximate the through bore, the seat assembly having an inward side oriented toward the gate cavity so that the seat assembly contacts the gate when the gate is in the closed position;
wherein the seat assembly comprises at least one seal, a seat, and a seat biasing energizer, and wherein the seat biasing energizer is located on an outboard side of the seat assembly and biases the seat assembly away toward the gate;
wherein the seat assembly is configured to translate in the direction of the through bore in response to pressure from the biasing energizer.
a stem connected to a proximate end of the gate;
a lubricant pocket disposed within the valve body in fluid communication with at least a portion of the stem and a portion of the gate;
a skirt assembly at least partially disposed between the valve body and the gate and at least partially disposed between the stem and the lubricant pocket;

wherein the skirt assembly comprises a skirt and a skirt biasing energizer;
wherein the skirt biasing energizer biases the skirt toward the gate.

Example 21. A dynamic slab gate valve comprising:
a valve body formed with a through bore and a gate cavity orthogonal to the through bore;
a gate disposed within the gave cavity, wherein the gate has a slab portion for halting flow in the through bore and an aperture portion for allowing flow through the gate valve and onward through the through bore; and
one or more dynamic features associated with the gate.

Example 22. The dynamic slab gate valve of Example 21, wherein the one or more dynamic features comprises a dynamic valve skirt.

Example 23. The dynamic slab gate valve of Example 21, wherein the one or more dynamic features comprises a dynamic seat assembly.

Example 23. The dynamic slab gate valve of Example 21, wherein the one or more dynamic features comprises a dynamic valve skirt and a dynamic seat assembly.

Example 24. The dynamic slab gate valve of Examples 1-7, 13-16, or 20-22, wherein the seat assembly further comprises a non-elastomeric u-seal, wherein the non-elastomeric u-seal is formed with a cross-sectional profile with a u or cup shape, and wherein the u-seal is disposed between the valve body and the seat and oriented so that fluid or pressure flow flows into the u or cup shape of the non-elastomeric u-seal.

Example 25. The dynamic slab gate valve of Example 23, wherein a wall portion of the non-elastomeric u-seal deforms to expand the u or cup shape of the non-elastomeric u-seal in response to fluid or gas pressure exerted within the u or cup shape of the non-elastomeric u-seal.

Example 26. The dynamic slab gate valve of Example 23, wherein the non-elastomeric u-seal is formed from PEET.

Example 27. The dynamic slab gate valve of Example 23, wherein the non-elastomeric u-seal is formed from PTFE.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A slab gate valve comprising:
a valve body formed with a through-bore in a first direction and formed with a gate cavity in a second direction, which is orthogonal to the first direction;
a slab gate having a first portion and a second portion, wherein the slab gate has a first side and a second side;
wherein the gate cavity is sized and configured to receive the slab gate;
wherein the first portion of the slab gate is sized and configured to occlude the through-bore when the slab gate is in a closed position;
wherein the second portion of the slab gate is formed with a flow aperture for allowing flow therethrough when the slab gate is in an open position;
an upper stem coupled to the slab gate for selectively moving the slab gate between the open position and the closed position;
a lower stem coupled to the slab gate and at least partially disposed within the gate cavity;
a downstroke lubricant cavity formed in a portion of the valve body proximate to the gate cavity for containing a lubricant for lubricating the lower stem in a downstroke;
a first seat cavity formed in the valve body proximate a first intersection of the through-bore and the gate cavity on a first side of the first intersection;
a second seat cavity formed in the valve body proximate a second intersection of the through-bore and the gate cavity on a second side of the second intersection;
a first dynamic seat assembly disposed in the first seat cavity;
a second dynamic seat assembly disposed in the second seat cavity;
a first dynamic skirt, disposed adjacent to the first side of the slab gate and disposed between the first seat cavity and the downstroke lubricant cavity, wherein a face of the first dynamic skirt contacts the first side of the slab gate;
a second dynamic skirt disposed adjacent to the second side of the slab gate and disposed between the second seat cavity and the downstroke lubricant cavity, wherein a face of the second dynamic skirt contacts the second side of the slab gate; and
wherein the first dynamic seat assembly comprises:
a first cylindrical seat having a first side and a second side, wherein the second side is adjacent to the first side of the slab gate,
wherein a first debris ring slot is formed on an inner portion of the first cylindrical seat,
a debris ring proximate the first side of the first cylindrical seat and disposed at least partially within the first debris ring slot,
wherein the first cylindrical seat is formed with a seat energizer cavity proximate the first side of the first cylindrical seat, and
a seat energizer disposed at least partially in the seat energizer cavity and operable to urge the cylindrical seat toward the slab gate.

2. The slab gate valve of claim 1, wherein the debris ring is perforated.

3. The slab gate valve of claim 1, wherein the first dynamic seat assembly further comprises a first seat seal disposed within a seat seal cavity located on a perimeter of the first cylindrical seat, wherein the first seat seal provides a seal between the first cylindrical seat and the valve body.

4. The slab gate valve of claim 1, wherein the first dynamic skirt is coupled to a first skirt energizer and the second dynamic skirt is coupled to a second skirt energizer, wherein the first skirt energizer urges the first dynamic skirt toward the gate and the second skirt energizer urges the second dynamic skirt toward the gate.

5. The slab gate valve of claim 4, wherein the first dynamic skirt and the second dynamic skirt each further comprise a lubricant guide.

6. The slab gate valve of claim 4,
wherein the first dynamic skirt has a first arcuate cutout that contacts the first dynamic seat assembly and wherein the first arcuate cutout conforms with a perimeter of the first dynamic seat assembly, and
wherein the second dynamic skirt has a second arcuate cutout that contacts the second dynamic seat assembly and wherein the second arcuate cutout conforms with a perimeter of the second dynamic seat assembly.

7. The slab gate valve of claim 1, wherein the upper stem coupled to the slab gate is coupled to the slab gate by a tee and t-slot connection.

8. The slab gate valve of claim 4, wherein the first skirt energizer or the second skirt energizer has a longitudinal length that extends in a same direction as a longitudinal length of the slab gate.

9. The slab gate valve of claim 4, wherein the first skirt energizer or the second skirt energizer has a longitudinal length that extends in a direction that is perpendicular to a longitudinal length of the slab gate.

10. The slab gate valve of claim 1, where the each of the first dynamic seat assembly and second dynamic seat assembly comprises a non-elastomeric u-seal, wherein the non-elastomeric u-seal is formed with a cross-sectional profile with a u or cup shape, and wherein the u-seal is disposed between the valve body and the seat and oriented so that fluid or pressure flow flows into the u or cup shape of the non-elastomeric u-seal.

11. The slab gate valve of claim 10, wherein a wall portion of the non-elastomeric u-seal deforms to expand the u or cup shape of the non-elastomeric u-seal in response to fluid or gas pressure exerted within the u or cup shape of the non-elastomeric u-seal.

12. The slab gate valve of claim 10, wherein the non-elastomeric u-seal is formed from PEET or PTFE.

\* \* \* \* \*